(12) United States Patent
Tomaj

(10) Patent No.: US 9,580,037 B2
(45) Date of Patent: Feb. 28, 2017

(54) WEAKENING OF LEATHER SKINS

(71) Applicant: MAGNA INTERIORS (EUROPE) GMBH, Munich (DE)

(72) Inventor: Anton Tomaj, Esslingen (DE)

(73) Assignee: MAGNA INTERIORS (EUROPE) GMBH, Munich (DE)

( * ) Notice: Subject to any disclaimer, the term of this patent is extended or adjusted under 35 U.S.C. 154(b) by 466 days.

(21) Appl. No.: 14/179,891

(22) Filed: Feb. 13, 2014

(65) Prior Publication Data

US 2014/0234564 A1   Aug. 21, 2014

(30) Foreign Application Priority Data

Feb. 20, 2013   (DE) .................. 10 2013 202 737

(51) Int. Cl.
*B60R 21/2165* (2011.01)
*B32B 5/02* (2006.01)
*B32B 7/12* (2006.01)
*B32B 9/02* (2006.01)
*B32B 9/04* (2006.01)

(52) U.S. Cl.
CPC ......... *B60R 21/2165* (2013.01); *B32B 5/026* (2013.01); *B32B 7/12* (2013.01); *B32B 9/025* (2013.01); *B32B 9/047* (2013.01); *B32B 2307/582* (2013.01); *B32B 2605/00* (2013.01); *Y10T 428/15* (2015.01)

(58) Field of Classification Search
CPC ........................ B60R 21/2165; B32B 5/024
USPC ........................................... 428/43
See application file for complete search history.

(56) References Cited

U.S. PATENT DOCUMENTS

2002/0043144 A1   4/2002   Reh et al.

FOREIGN PATENT DOCUMENTS

| DE | 19910141 A1 | 9/2000 | |
|---|---|---|---|
| DE | 19937373 A1 | 2/2001 | |
| DE | 102005013477 A1 | 10/2006 | |
| DE | 102006027082 A1 | 12/2007 | |
| DE | 102006054586 B3 * | 1/2008 | ........... B29C 59/007 |
| WO | 2011038856 A2 | 4/2011 | |

* cited by examiner

*Primary Examiner* — Brent O'Hern

(74) *Attorney, Agent, or Firm* — Banner & Witcoff, Ltd.

(57) ABSTRACT

A shaped trim part configured to cover an airbag for a motor vehicle, and which includes at least one support which is weakened along an opening line which delimits an opening cover, and a decorative layer composed of leather and arranged on and/or over the support.

18 Claims, 3 Drawing Sheets

WEAKENING OF LEATHER SKINS

CROSS-REFERENCE TO RELATED APPLICATIONS

The present application claims priority 35 U.S.C. §119 to German Patent Publication No. DE 102013202737.0 (filed on Feb. 20, 2013), which is hereby incorporated by reference in its entirety.

TECHNICAL FIELD

Embodiments relate to a shaped trim part configured to cover an airbag for a motor vehicle, and which includes at least one support which is weakened along an opening line which delimits an opening cover, and a decorative layer composed of leather and arranged on and/or over the support.

BACKGROUND

A support is, for example, a shaped plastic part which may be produced, for example, as an injection-moulded part or the like. The intermediate layer which is fastened, for example, adhesively bonded, on and/or over the support may be, in particular, a knitted fabric, namely a knitted spacer fabric.

Weakening in this context means, for example, a weakening of the thickness or a local thickness reduction in the sense of a notch, or else a perforation or the like. A decorative layer, which is made from leather, is as a rule adhesively bonded to the knitted spacer fabric. A shaped trim part which is formed in this way is used, for example, as an interior cover in a vehicle, for example, as a dashboard cover, door interior trim or the like.

In order that an airbag, which is arranged in a firing channel behind the shaped trim part, namely behind the opening cover of the shaped trim part, may trigger reliably, the support is weakened along the opening line with the formation of the opening cover. The opening cover is of substantially rectangular configuration, the weakening as a rule breaking open on three sides during triggering of the airbag, with the result that the opening cover folds open in a hinge-like manner. Here, the opening cover may also include a plurality of covers or cover sections which individually fold open in a hinge-like manner. During the opening, the intermediate layer, for example, the knitted spacer fabric, likewise tears open along the tear line.

In order to avoid the opening cover or airbag cover being visible from the vehicle interior, the entire shaped trim part is as a rule provided with a decorative layer which, for example, is made from leather, without seams or the like being provided in the region of the opening cover. In order to ensure defined tearing open of the airbag cover during the airbag triggering, the leather is split to a maximum thickness of 0.7 mm and used without weakening such as, for example in WO2011038856.

The leather hide may be weakened, with methods of laser weakening being current at the moment. Rear-side weakenings of the leather layer, however, are disadvantageous, since the rear-side weakening lines of the leather layer may stand out on and/or over the surface and may then become visible from the vehicle interior.

German Patent Publication No. DE 10 2006 027 082 A1 discloses a shaped trim part of the type described at the outset, in which the decorative layer is non-weakened in the region of the opening line of the support part or the intermediate layer.

German Patent Publication No. DE 19910141 A1 discloses an airbag covering having a tear line, the covering leather layer having a residual thickness of from 0.3 to 1.5 mm. The weakening is produced by way of a knife, which permits only simple, linear weakening structures. The described region where the residual layer is preserved with a value which begins at 0.3 mm is not suitable for reducing the visibility of the introduction of weakening.

German Patent Publication No. DE 102005013477 discloses a weakening of the covering layer in a curved shape, perpendicularly with respect to the plane of the cover. Here, the residual thickness to be preserved of the cover is considered to be advantageous at from 0.2 to 0.8 mm. This small residual layer may be sufficient in this embodiment, since the different planes of the weakening from the support via the spacer layer and an additional layer are not aligned with the weakening in the actual decorative layer. The production in accordance with this method, however, is very complicated.

German Patent Publication No. DE 19937373A1 discloses a tear edge on a film, no support being provided below the film in this form of interior trim for vehicles. The tear edge is of zigzag-shaped configuration and may be produced via microperforations.

SUMMARY

In accordance with embodiments, a shaped trim part is provided to cover an airbag for a motor vehicle, and which ensures reliable triggering of an airbag, satisfies high aesthetic requirements and may be produced economically.

In accordance with embodiments, reliable and defined airbag triggering may be ensured with a locally weakened leather layer even when the leather layer has a thickness of at least 0.8 mm and the weakening takes place in the form of a line extends by sharp turns in alternating directions, i.e., a zigzag line at an angle.

In accordance with embodiments, a trim part is provided to cover a motor vehicle airbag, the trim part including at least one of: at least one support layer which is weakened along an opening line which delimits an opening cover; and a decorative layer arranged over the support layer and which has a local weakening in a region of a tear line, the decorative layer having a thickness of at least 0.8 mm in the region of the tear line, wherein the tear line extends in a zigzag pattern at an angle to a direction perpendicularly with respect to the plane of a surface of the trim part.

In accordance with embodiments, a trim part is provided to cover a motor vehicle airbag, the trim part including at least one of: a support which is weakened along an opening line which delimits an opening cover; an intermediate layer arranged over the support layer; an adhesive layer which fastens the intermediate layer to the support; and a decorative layer arranged over the support layer and which has a local weakening in a region of a tear line, the decorative layer having a thickness of at least 0.8 mm in the region of the tear line, wherein the tear line extends in a zigzag pattern at an angle to a direction perpendicularly with respect to the plane of a surface of the trim part.

Since very thin splitting of the leather layer is dispensed with, the trim in accordance with embodiments also satisfies high aesthetic requirements in modern motor vehicles.

In accordance with embodiments, a decorative layer, composed of leather and fastened on and/or over an intermediate layer, may have a thickness greater than 0.8 mm. Consequently, a comparatively thick leather may be processed which tolerates local weakenings without becoming visible on an upper side. A leather layer of this type may be produced economically, without the leather which is first of all produced and trimmed being split in the course of further processing.

Adhesive bonding of the leather over the full area on and/or over the intermediate layer, for example, a knitted fabric, may be provided in accordance with embodiments. Such adhesive bonding over the full area means adhesive bonding over the full area in the surroundings of the tear line. Consequently, the adhesive bond is not cut out in the surroundings of the tear line. In accordance with embodiments, there is the possibility, however, to provide cut-outs of the adhesive bond in other regions of the shaped trim part. There is therefore the possibility in principle to dispense with an adhesive bond in the region of the opening cover itself or in part regions of the opening cover. Adhesive bonding over the full area may be preferable for production reasons. The adhesive bond of the intermediate layer on and/or over the support also takes place over the full area as a rule.

In accordance with embodiments, various adhesives may be used for the adhesive bonding. The entire shaped trim part may be trimmed with a unitary and, consequently, single-piece decorative layer which is made from leather. This single-piece decorative layer, which is made from leather, may then have the same thickness over its entire area. There is no necessity to connect the leather in regions which are comparatively far away from the airbag opening and have a greater thickness of, for example, 1 mm or greater with leather regions which are split down to a smaller thickness merely in the surroundings of the airbag cover or the opening cover. As a result, the use of seams in the visible region of the trim is superfluous.

DRAWINGS

Embodiments will be illustrated by way of example in the drawings and explained in the description below.

FIG. 1 illustrates a diagrammatic illustration of a shaped trim part in accordance with embodiments.

FIGS. 2(a) and 2(b) illustrate plan views of a shaped trim part in accordance with embodiments.

FIGS. 3(a) and 3(b) illustrate a shaped trim part in accordance with embodiments.

DESCRIPTION

Figure 1:
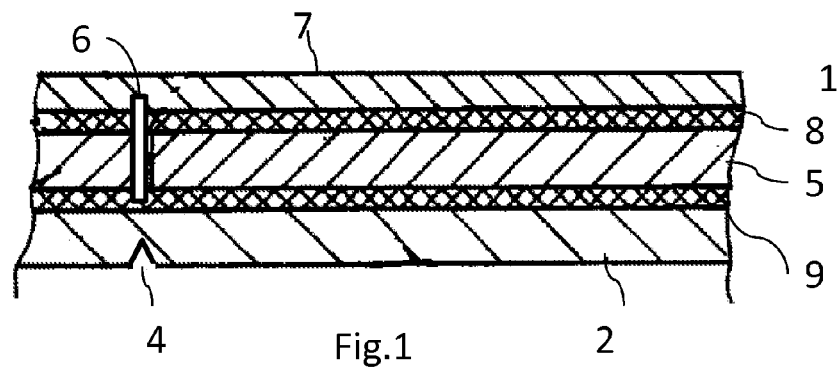

As illustrated in FIG. 1, a shaped trim part 1 is provided to cover an airbag for a motor vehicle. The basic construction of the shaped trim part 1 includes a first or support layer 2, a second or intermediate layer 5 provided on and/or over the support layer 2, and a third or decorative layer 7 composed of a material such as leather and which is provided on and/or over the intermediate layer 5.

The support layer 2, as a rule, may be configured as a shaped polymer part, for example, an injection-moulded part. The support layer 2 may be a support for a dashboard and/or another interior covering. An airbag may be arranged spatially behind the shaped trim part 1 and behind the support layer 2 in a firing channel.

Figure 2:
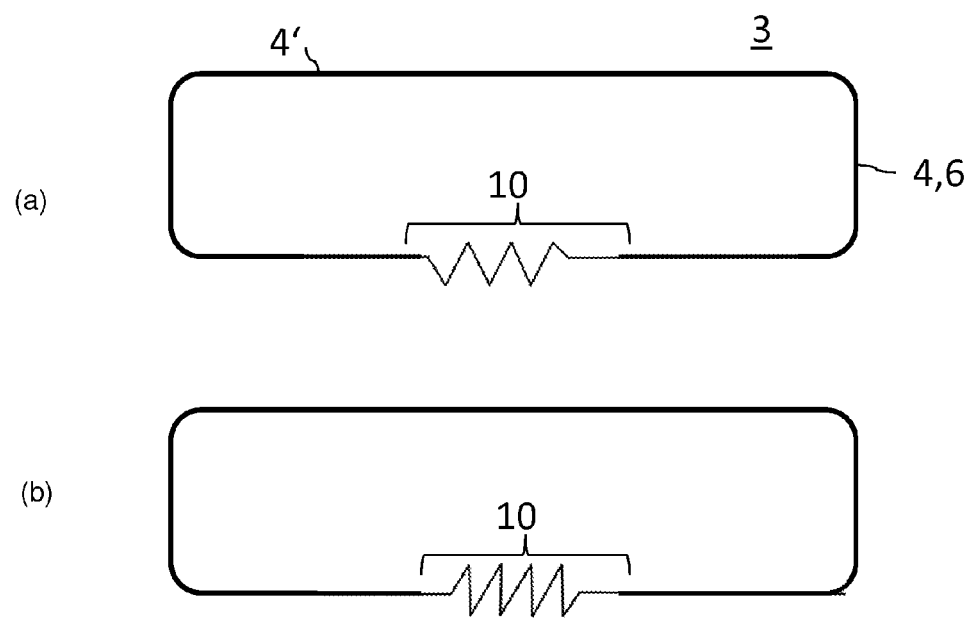

As illustrated in FIGS. 1 and 2, the support layer 2 may be weakened along an opening line 4. This weakening or opening line 4 defines an opening cover 3 of the support. Here, the opening cover 3 is of substantially rectangular configuration or cross-section in plan view. In accordance with embodiments, the weakening which forms the opening line 4 is provided on three side lines of the rectangle. The fourth side line 4' forms, as it were, an opening hinge, with the result that the cover folds open, as it were, during the airbag triggering, by the support layer 2 tearing open or breaking open along the opening line 4. Consequently, the opening cover folds open "in the manner of a window." Embodiments are not limited, and may also provide for an opening cover having two sections which fold open in the manner of a "double window."

The intermediate layer 5, which is fastened on and/or over the support layer 2, may be weakened along a tear line 6. The intermediate layer 5 itself may be configured, for example, as a knitted spacer fabric. The tear line 6 of the intermediate layer 5 may be spatially aligned with the opening line 4.

In accordance with embodiments, the decorative layer 7 is also weakened in the region of the tear line 6 of the intermediate layer 5. Here, the decorative layer 7 which is made from leather, is adhesively bonded over the full area to the intermediate layer 5 via a first adhesive layer 8. The knitted fabric 5 may be fastened on and/or over the support layer 2 via a second adhesive layer 9.

The decorative layer 7 may partially include tear line 6. As illustrated in FIG. 2(a), the tear line 6 follows the contour of the opening cover 3 as far as a region 10, in which the tear line forms a zigzag pattern. Here, the peaks of the zigzag pattern point away from an imaginary centre line in the plane of the surface of the shaped trim part. As illustrated in FIG. 2(b), the region 10 is configured having a sawtooth pattern.

The spatial position of the region 10 in the course of the tear line 6 is selected here only by way of example. The tear line 6 is produced by weakening of the intermediate layer 5 and the decorative layer 7. Here, mechanical or laser weakening methods may be used, for example, as described by way of example in German Patent Application No. DE 102011116542. The region 10, in which the decorative layer 7 is pre-treated by the zigzag weakening, preferably lies in an area in which the initial ignition of the airbag takes place and therefore rapid, efficient tearing open should begin. The success of the tearing open is produced efficiently as a result of the weakening which is more pronounced than a single linear weakening.

Figure 3:
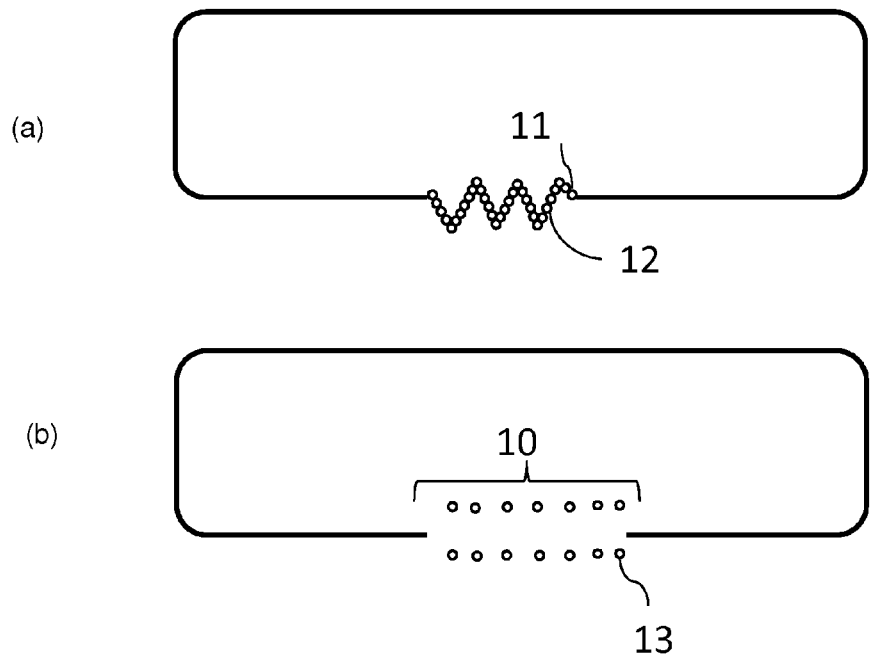

If the method of laser weakening is used, punctiform weakening may take place instead of the linear weakening, as illustrated in FIG. 3.

The discrete perforating pattern which is illustrated in FIG. 3 with a row of holes 11, 12 which are spaced apart approximately uniformly corresponds to typical discontinuous processing. Here, the spatial position of the region of action of the laser light beam is fixed during its action. During the re-positioning of the workpiece, that is to say of the decorative layer 7, the action of the laser light beam is interrupted, in contrast. As a result, the region in the connecting line of adjacent holes 11 remains unprocessed. In discontinuous processing, the region of action of the laser light beam jumps from hole 11 to hole 11, as it were, along the processing direction. This discontinuous processing may be realized very simply by way of the currently customary laser light sources, because on account of their design they do not emit a continuous beam, but rather emit a controllable sequence of laser light pulses.

As illustrated in FIG. 3(b), in contrast, the zigzag or sawtooth pattern of the weakening points is indicated only by end points 13. Here, every configuration is also possible which is an intermediate state between the punctiform weakening, the weakening holes 11 being lined up in a row in the manner of a pearl necklace, and a structure, in which only the peaks of the pattern are processed.

Figure 4:
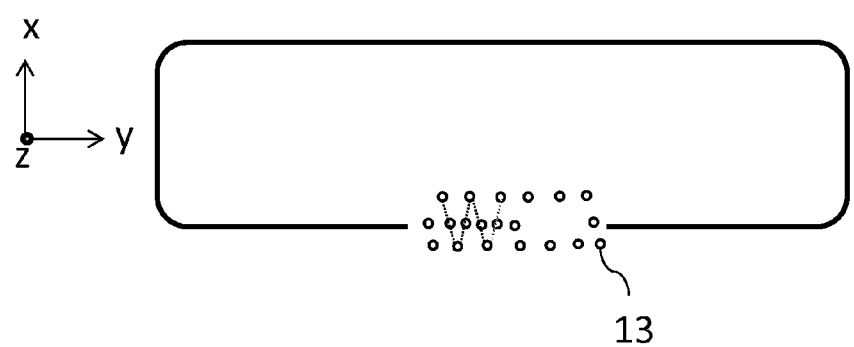
FIG. 4 illustrates a shaped trim part in accordance with embodiments.

As illustrated in FIG. 4, the holes 13 lie along a zigzag line or a sine curve or a sawtooth. In the most general case, the weakening follows a curve which has an amplitude a perpendicularly with respect to the imaginary tear line, the amplitude being variable and it also being possible for the spacing of the amplitude peaks to be selected in an adjustable manner.

The simplest embodiment of the weakening by way of a zigzag structure takes place only in the plane of the drawing. This means that the decorative layer 7 moves below the laser only in the x-y plane by the course which it is desired to obtain. As an alternative to this, the lens system of the laser beam may also move. As a result, structures which have the same depth for all holes 11 are produced without further arrangements.

If the decorative layer 7 is set against the laser beam at an angle and performs the same movements as described above without the power output being varied, the zigzag movement would lead to a course of the holes in different depths in the z-direction. The course of the holes is then also no longer perpendicular with respect to the decorative surface and with respect to the plane x-y. It is certainly possible here, however, to vary the depth of the weakening or the blind holes for the discontinuous case.

Figure 5:
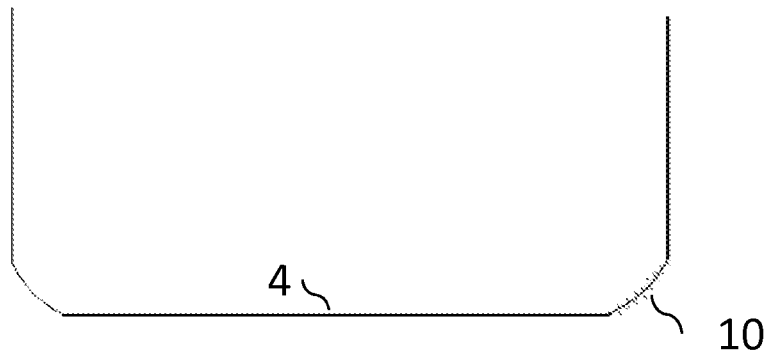
FIG. 5 illustrates a shaped trim part in accordance with embodiments.

As illustrated in FIG. 5, during the triggering of the airbag, a U-shaped flap breaks in the hinge region and is possibly held by plates or a net. The targeted weakening in the hinge region by the region 10 optimizes the tearing-open behaviour.

Figure 6:
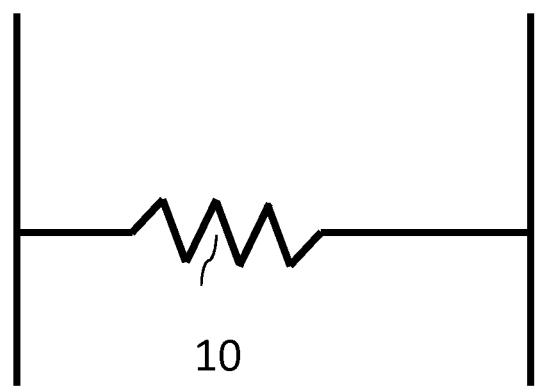
FIG. 6 illustrates a shaped trim part in accordance with embodiments.

As illustrated in FIG. 6, an H-shaped flap contains the region 10 of the weakening in the centre line.

The term "coupled," "attached," "fastened" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A trim part for covering a motor vehicle airbag, the trim part comprising:
    at least one support layer which is weakened along an opening line which delimits an opening cover; and
    a decorative layer arranged over the support layer and which has a local weakening in a region of a tear line, the decorative layer having a thickness of at least 0.8 mm in the region of the tear line,
    wherein the tear line has a first lateral linear portion and extends in a zigzag pattern into a second lateral linear portion, said tear line at an angle to a direction perpendicularly with respect to the plane of a surface of the trim part.

2. The trim part of claim 1, wherein the decorative layer is composed of leather.

3. The trim part of claim 1, further comprising an intermediate layer which is arranged over the support layer.

4. The trim part of claim 3, wherein the decorative layer is arranged over the intermediate layer.

5. The trim part of claim 3, wherein the intermediate layer is adhesively bonded over its full area to the support layer.

6. The trim part of claim 1, wherein the tear line follows a curve at least in sections, the curve having an amplitude at least perpendicularly with respect to an imaginary tear line.

7. The trim part of claim 1, wherein the tear line, at least partially, comprises a plurality of weakened points which are connected to one another.

8. The trim part of claim 1, wherein the tear line, at least partially, comprises a plurality of weakened points which in each case lie at peaks of the zigzag pattern.

9. The trim part of claim 1, wherein the decorative layer is composed of a single piece of leather.

10. The trim part of claim 1, wherein the decorative layer has the same thickness over the entire area of the support layer.

11. A trim part for covering a motor vehicle airbag, the trim part comprising:
    a support which is weakened along an opening line which delimits an opening cover;
    an intermediate layer arranged over the support layer;
    an adhesive layer which fastens the intermediate layer to the support; and
    a decorative layer arranged over the support layer and which has a local weakening in a region of a tear line, the decorative layer having a thickness of at least 0.8 mm in the region of the tear line, wherein the tear line has a first lateral linear portion and extends in a zigzag pattern into a second lateral linear portion, said tear line at an angle to a direction perpendicularly with respect to the plane of a surface of the trim part.

12. The trim part of claim 11, wherein the decorative layer is composed of leather.

13. The trim part of claim 11, wherein the decorative layer is arranged over the intermediate layer.

14. The trim part of claim 11, wherein the adhesive layer adhesively bonds the intermediate layer over its full area to the support layer.

15. The trim part of claim 11, wherein the tear line, at least partially, comprises a plurality of weakened points which are connected to one another.

16. The trim part of claim 11, wherein the tear line, at least partially, comprises a plurality of weakened points which in each case lie at peaks of the zigzag pattern.

17. The trim part of claim 11, wherein the decorative layer is composed of a single piece of leather.

18. The trim part of claim 11, wherein the decorative layer has the same thickness over the entire area of the support layer.

* * * * *